United States Patent Office 3,086,151
Patented Apr. 16, 1963

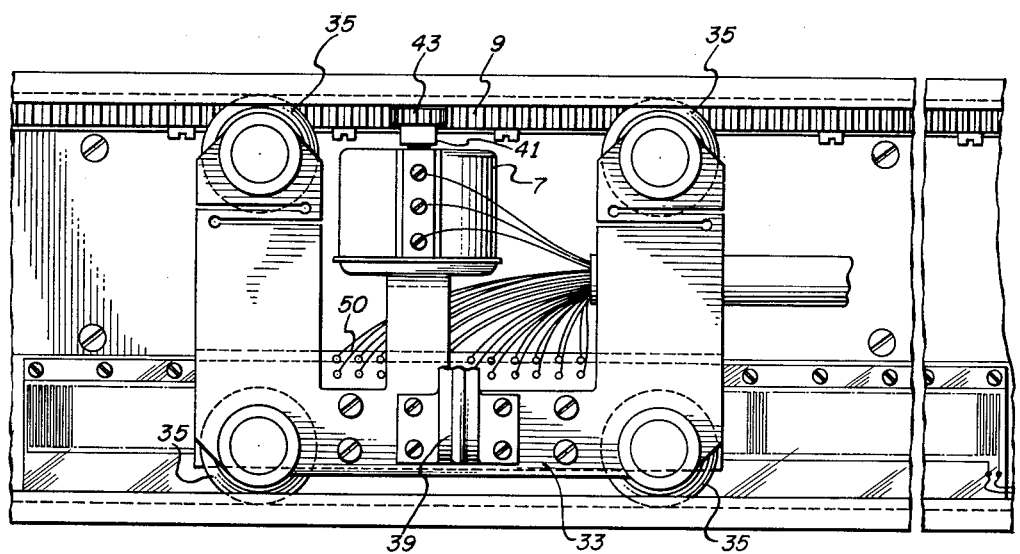
FIG.2.
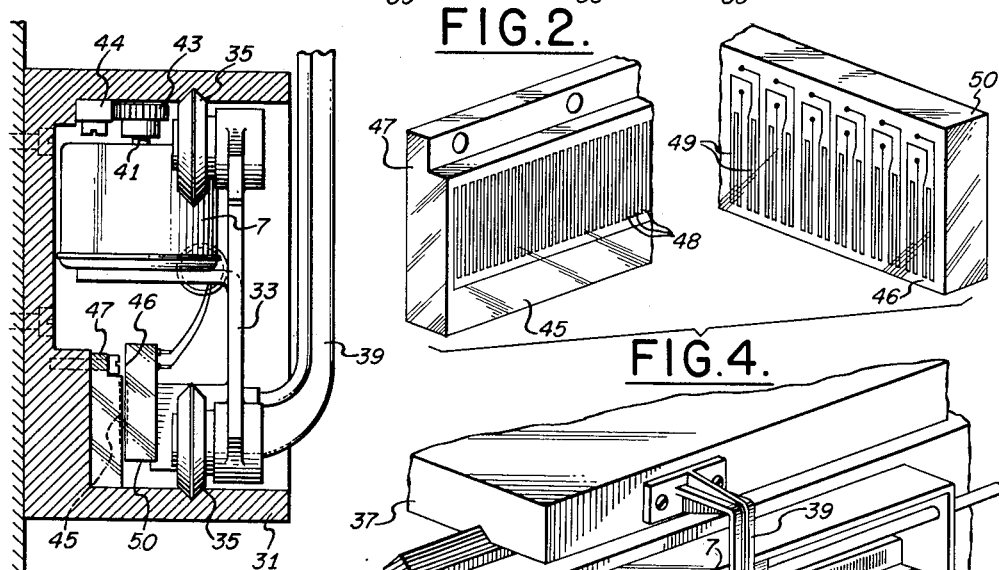
FIG.3.
FIG.4.
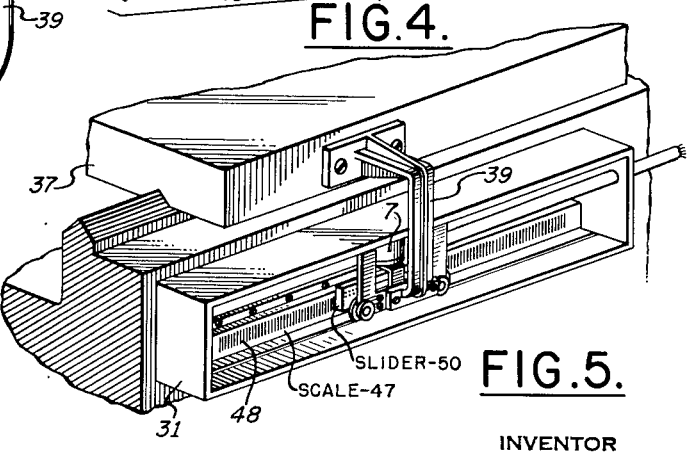
FIG.5.
INVENTOR
PETER J. HERZL

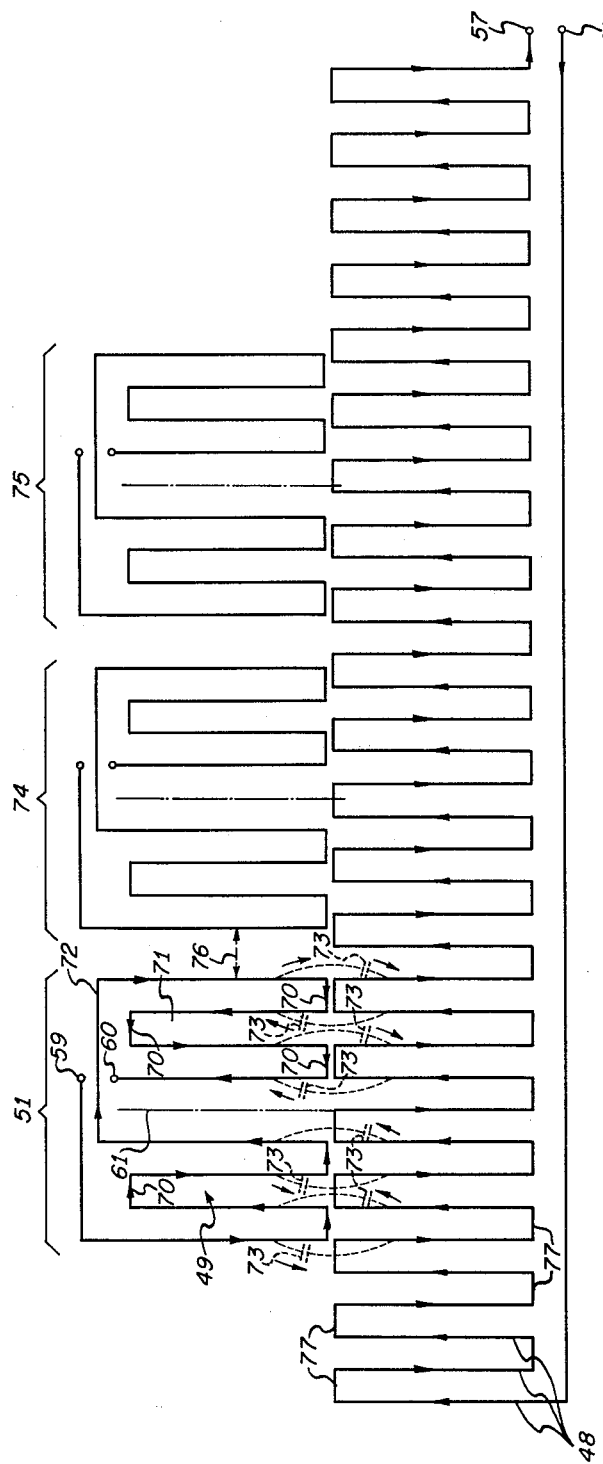

3,086,151
POSITIONAL CONTROL SYSTEM AND
PICKOFF THEREFOR
Peter Joseph Herzl, Montreal, Quebec, Canada, assignor to Sperry Gyroscope Company of Canada, Ltd., Montreal, Quebec, Canada
Filed June 7, 1960, Ser. No. 34,446
Claims priority, application Canada Jan. 21, 1960
11 Claims. (Cl. 318—28)

This invention relates to improvements in positioning control systems for moving a machine element precisely to a desired or commanded position with respect to another machine element. Such systems are particularly applicable to the automatic control of machine tools in response to sequences or programs of command signals which may be pre-recorded, for example as coded patterns of holes punched on a tape.

Systems of the type of which the present invention pertains use position sensing devices, hereinafter called pickoffs, to determine the actual position of the movable machine element for comparison with the commanded position. A "fine" pickoff capable of detecting positional displacements as small as one thousandth inch or less is required to achieve useful precision of control. The response of the fine pickoff is unique throughout a small range of motion. Beyond this range, the response corresponding to a particular position will be the same as, and indistinguishable from, the responses corresponding to a number of other positions. A "coarse" pickoff is used to resolve the ambiguity by detecting the position of the machine element approximately but uniquely. The output of the coarse pickoff is compared with a coarse command signal to control driving means for positioning the movable machine element within the range of unique response of the fine pickoff about the precise desired position. When the coarse error signal reaches a certain minimum value, a switching device operates automatically to bring the fine positioning control into operation.

The fine position pickoff used in systems of the above described type generally consists of a "scale" member and a "slider" member mounted in cooperative relationship with each other, one being connected to the movable machine element and the other being connected to another part of the machine such as a bed or frame. The scale includes a series of energy transfer elements arranged like calibration marks, and the slider includes one or more similar energy transfer elements acting as index or fiducial marks. The energy transfer elements may be slits or transparent lines in an opaque body, or electrically conductive strips or bars on an insulating body, for example. In the case of optical slits, the energy transferred is light. If the scale is uniformly illuminated on one side, the amount of light passing through a slit in the slider will depend upon its positional relationship to the scale; when the slider slit coincides with a scale slit, the light transferred through them will be a maximum. Midway between maxima, it will be a minimum, or null. In the case of conductive strips, the energy transferred may be alternating current electricity and the conductors may be used as capacitors or as inductors. The latter alternative is preferred at present.

In any event the degree of energy transfer between the scale member and the slide member will vary cyclically as one is moved with respect to the other, each cycle representing a unit displacement of a size that depends directly upon the spacing between the energy transfer elements on the scale member. In the present state of the art, the smallest practical spacing corresponds to a displacement per cycle of about one hundredth inch. Some systems use displacements per cycle as large as one tenth inch. The required much finer resolution (of the order of one thousandth inch or less) is obtained by analog methods of interpolation involving measurement of the amplitude of the signal transferred between the slider and scale, or comparisons of the amplitudes of signals transferred simultaneously between the scale and slider at two different points.

Such analog methods of interpolation have certain disadvantages, particularly when the ratio between the displacement per cycle and the smallest displacement to be detected is very large. If the command signal is in digital form, a complicated digital to analog converter is required. Small variations in gain of amplifiers handling analog signals before comparison will introduce errors. Failure of an amplifier or other component in one signal channel (i.e. that of the command signal, or that of the present position signal) may result in a "hard over" error signal, causing the machine part to be driven abruptly to an incorrect position and possibly destroying the workpiece or damaging the machine.

The principal object of the present invention is to provide improved fine position pickoff devices capable of resolving displacements of one thousandth inch or less without resort to analog interpolation.

Another object is to provide improved positional control systems adapted for use with said improved pickoff devices.

A more specific object is to provide improved fine position pickoff devices of the inductive type operating on the vernier principle.

A still further object is to provide inductive pickoff devices of the above mentioned type wherein the conductors are so connected and disposed as to balance out undesirable inductive and capacitive coupling between the scale and slider members.

The invention will be described with reference to the accompanying drawings, wherein:

FIG. 2 is a front elevation showing a typical mechanical arrangement of the fine and coarse pickoffs of the system of FIG. 1;

FIG. 3 is an end view of the structure of FIG. 2;

FIG. 4 shows details of the scale and slider members of the fine pickoff device;

FIG. 5 is a perspective view showing the structure of FIG. 2 mounted on the bed and connected to the carriage of a machine tool; and FIG. 6 is a diagram showing a typical layout of a representative number of the scale and slider members of the fine pickoff device in an arrangement to provide a vernier ratio of five to one.

Figure 1:
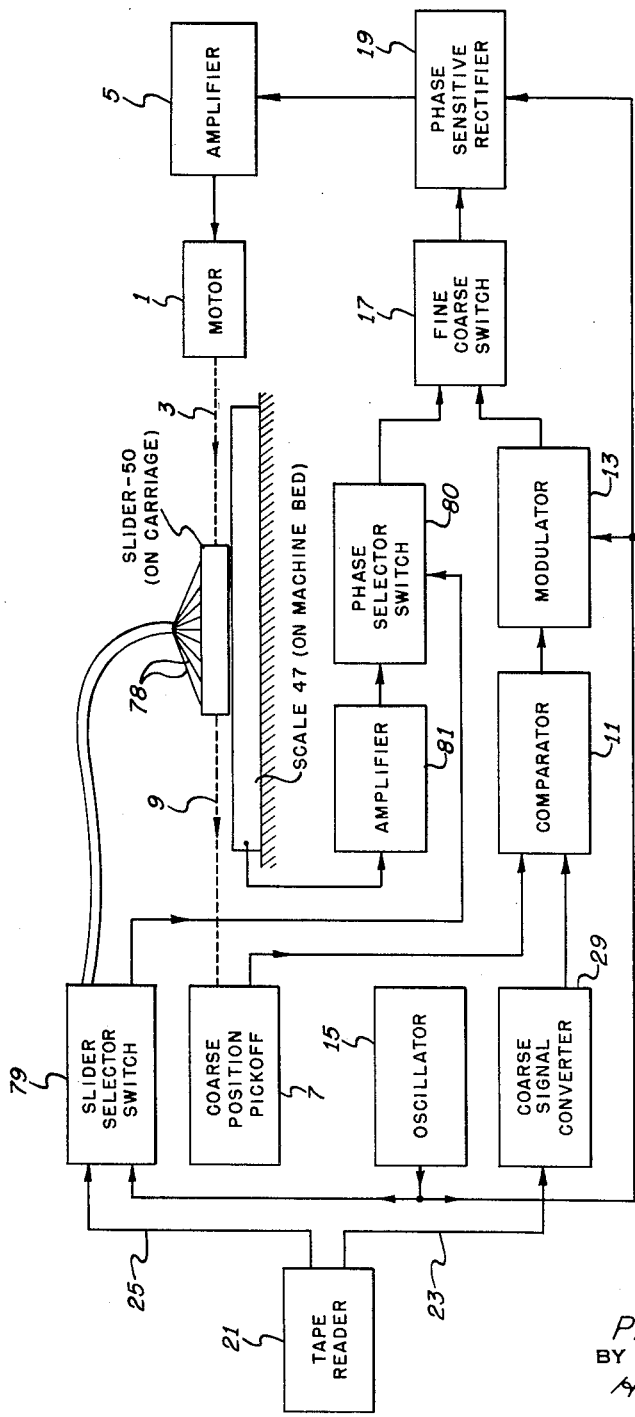
FIG. 1 is a schematic block diagram of a machine tool positional control system embodying the invention in a presently preferred form.

Referring to FIG. 1, a reversible motor 1 is mechanically coupled, as schematically indicated by the dash line 3, to a machine part such as a carriage which is to be positioned with respect to the machine bed, for example. The motor 1 is connected in known manner to be energized in response to the output of an amplifier 5. The motor 1 may be a hydraulic ram, in which case it is to be understood that the amplifier 5 includes control valve means connected to a source of fluid under pressure and arranged to be actuated by an electrical control signal.

A coarse position pickoff 7 is also coupled to the movable machine part, as indicated schematically by dash line 9. The pickoff 7 is arranged in conventional manner to provide an output signal representing approximately, but unambiguously, the position of the movable part. The pickoff 7 may be, for example, a potentiometer energized from a D.-C. source and driven by means 9. The output of coarse pickoff 7 is applied to a comparator 11, where its magnitude is compared to that of a command signal that represents the desired position of the machine carriage. The comparator 11 may include a resistor network, electrically similar to the potentiometer in the pickoff 7, and interconnected with it to form a Wheatstone bridge. Any difference between the actual position and the commanded position unbalances the bridge, producing a D.-C. error signal of magnitude and polarity corresponding respectively to the amount and direction of the difference between the actual and commanded positions.

The D.-C. coarse error signal output of comparator 11 could be applied directly to amplifier 5 to control the positioning motor 1. However, on the presently preferred embodiment of the invention, it is first converted to a relatively high frequency A.-C. form similar to that of the fine error signal to be described, then reconverted to a D.-C. signal by the same means that converts the fine error signal to D.-C. For this purpose the coarse error signal is applied to a modulator 13 which is supplied with high frequency A.-C. excitation from an oscillator 15. The frequency may be, for example, 10,000 cycles per second. The output of modulator 13 is 10,000 cycle signal having an amplitude corresponding to the magnitude of the D.-C. coarse error signal and a phase relationship with respect to the A.-C. excitation corresponding to the polarity of the D.-C. coarse error signal.

The A.-C. coarse error signal output of modulator 13 is one of the inputs to a fine-coarse selector switch 17 which is arranged to receive also the fine error signal, and to apply one of said error signals to a phase sensitive rectifier 19. The fine-coarse switch 17 is arranged to operate only in response to the coarse error signal, applying the coarse error signal to the rectifier 19 except when the amplitude of said signal is below a predetermined level, corresponding to a positional error within the unambiguous range of the fine pickoff. The switch 17 may be a marginal relay with double-throw switch contacts and an actuating magnet energized by the coarse error signal. Alternatively, the switch 17 may be an electronic switching circuit of known type.

The phase sensitive rectifier 19 is a balanced demodulator or equivalent conventional circuit, supplied with A.-C. reference signal from the oscillator 15 and producing a D.-C. output of magnitude and polarity corresponding respectively to the amplitude of the A.-C. error signal input, and its phase with respect to the reference signal.

The initial source of command signals in the system of FIG. 1 is a tape reader 21 which may be of conventional type and is preferably designed to operate with standard perforated tapes in "block reading" fashion, producing simultaneous output signals representing two or more complete pieces of information such as coarse and fine commands while the tape remains stationary. In a complete machine tool control system, the tape reader may be required to translate command signals related to motions along two or more axes, such as traverse and cross feed, as well as auxiliary signals for controlling other functions, for example, cutter speed. These may all be read as a block of information corresponding to a particular point or station on the work piece. When the work at that station is completed, the tape is moved to a new position, exposing a new area of the tape for reading of the block of information that corresponds to the next station on the work piece.

FIG. 1 shows only one control channel corresponding for example to a traverse feed motion on a milling machine. In the apparatus of FIG. 1, the tape reader 21 simultaneously provides two outputs: the coarse command, on line 23, and the fine command, on line 25. Although they are shown as single lines on the drawing, it is to be understood that each of lines 23 and 25 is a multiple or cable consisting of a plurality of conductors, each corresponding to one hole position in the area of a "block" of the tape. For the purpose of explanation, it may be assumed that the tape reader connects an individual conductor to a point of reference potential, such as ground, when there is a hole in the tape at the position corresponding to that conductor, and disconnects the conductor from said point when there is no hole at the respective position on the tape. Each conductor may be connected to form part of the circuit for energizing a respective relay to be picked up in response to a hole in the tape, and dropped out in response to the absence of a hole.

The pattern of holes in a block of the tape is a binary digital representation of the position to be comanded, corresponding numerically to the distance of the commanded position from a reference or zero position. The exact manner in which a particular pattern of holes represents a particular distance depends upon the units of measurement used, and upon the "language" or code adopted. The presence or absence of a hole in the tape may be regarded as expressing a binary digit 1 or 0, and the location on the block as the binary order, e.g. ones, two, fours, etc.

For convenience in preparing the tape with reference to conventionally dimensioned drawings, it is preferable to use a code wherein decimal digits are represented by groups of binary digits, for example as follows—

| Decimal digit: | Binary group |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

Four hole positions are required to represent each decimal digit. The location of each four-position group on the tape block represents its respective decimal order.

Suppose that the command is to represent the position of the carriage in inches, to the nearest thousandth, and that the total traverse range of the machine carriage is ten inches. The number of significant decimal places required to accommodate this information is four, since the ten inch total range is to be divided into $10^4$ discrete possible commanded positions. Under these conditions each tape block must provide for 16 hole locations for the traverse feed. The number of hole locations required for other command functions may be determined in a similar manner.

The coarse command must be sufficiently detailed to define the commanded position to an approximation that is within the unambiguous range of the fine pickoff. Assuming said range to be twenty-five thousandths inch (.025″), the coarse command must identify any one of 400 points in the ten inch total traverse range. This can be done with 11 binary digits, using four for each significant decimal place and an additional three to provide the factor of four. As a practical matter, a full 12 of the 16 individual output conductors from the tape reader 21 may be contained in the coarse command line 23.

The coarse command line 23 goes to a coarse signal converter 29 which converts the command signal from digital to analog form for comparison with the coarse present position signal provided in analog form by the coarse pickoff 7. The converter 29 comprises a group of relays, each connected to be energized through a respective one of the individual conductors in the coarse command line 23 and each provided with a contact arrangement connected to short circuit a respective resistor in one arm of the network of comparator 11 while removing a short circuit from a corresponding resistor in the other arm. In this way the pattern of the relays, i.e. the manner in which some are energized and others de-energized, determines the relationship between the resistances of the two arms.

The values of the individual resistors are related in the same manner as the numerical values represented by the corresponding conductors in line 23. Thus the bridge arms formed by the network in comparator 11 are adjusted stepwise to a relationship which places their junction point at a potential approximately the same as that which would appear at the slider of the potentiometer in the coarse pickoff 7 if the machine carriage were at the commanded position. As previously explained, any difference between the actual position unbalances the bridge circuit, producing the coarse error signal.

Referring to FIGS. 2, 3 and 5 the pickoffs are disposed in an enclosure 31 mounted on a stationary part of the machine such as the bed, as shown in FIG. 5. A carriage 33 is supported on rollers 35 for rectilinear motion within the enclosure 31 parallel to the motion of the machine carriage 37 (FIG. 5). The pickoff carriage 33 is connected to the machine carriage 37 by a bracket 39.

The coarse pickoff device 7 is mounted on the carriage 33. Its shaft 41 carries a pinion 43 which engages a rack 44 fixed to the wall of the enclosure 31. The scale member 45 of the fine pickoff is also disposed on the inner wall of enclosure 31, parallel to the direction of motion of the carriage 33. The slider member 46 is supported on the carriage 33 in closely spaced parallel relationship to the scale member 45.

As shown in FIG. 4, the scale member consists of a base 47 of electrically insulating material carrying an array of parallel uniformly spaced conductors 48 serially connected, with each end of each conductor intermediate the ends of the array connected to the corresponding end of an adjacent conductor. The slider member 46 carries a plurality of groups 49 of similar conductors on an insulating base 50. The conductors within each group 49 are parallel and spaced the same as the scale conductors 48. The conductors may be placed on the scale and slider members by any known method that insures uniform spacing and dimensional stability, such as a photographic process.

FIG. 6 shows schematically, with the conductor spacings greatly enlarged, portions of the conductor arrays on the scale and slider member. The slider array is shown above the scale array in FIG. 6 to avoid confusion between the two sets of conductors; it is to be understood that the two arrays are actually in face to face relationship as shown in FIG. 3.

The scale conductors 48 are serially connected as shown to form a single "coil" or winding having one pair of terminals 57, 58. The interconnections between the conductors 48 are such that a set series current would flow in adjacent conductors in the opposite vertical directions as indicated by the arrow heads in the view of FIG. 6.

Consider now a single conductor on the slider, disposed in inductive relationship with a nearby region of the scale member, and carrying an alternating current. If such slider conductor is midway between two of the scale conductors, identical voltages will be induced in said two conductors. The two induced voltages will be equal in amplitude but in phase opposition with respect to the terminals 57, 58 so that the induced voltages will cancel. Similarly smaller, but equal and out of phase voltages will be induced in more remote pairs of scale conductors, and will cancel, so that a zero net voltage is produced at the terminals. If the slider conductor is not midway between two scale conductors, the induced voltages do not cancel and a finite A.-C. voltage appears at the output terminals 57, 58. When the slider conductor is to the left of a midpoint, it will be closer to one of the conductors 48 whose induced voltage will determine the phase of the voltage at output terminals 57, 58. The resulting output voltage will have a certain specific phase relationship to the excitation voltage supplied to the slider, and an amplitude that varies with the displacement of the slider conductor from the midpoint, reaching a maximum value when the slider is directly over the scale conductor. When the slider conductor is to the right of midpoint, the phase of the output voltage will be reversed. Thus, as the slider conductor is moved along the scale, the output voltage will vary cyclically in amplitude, reversing in phase each time the slider conductor passes a point midway between two scale conductors.

As a practical matter, the voltages induced in the scale member by a single slider conductor are too small to be conveniently useful. Also, there is capacitive coupling, in addition to the desired inductive coupling, between the slider and scale members. The inductive coupling may be increased by using a group of series connected slider conductors instead of a single one. Each such group may be like a short portion of the scale member; in FIG. 6, each slider group 49 consists of four conductors connected in the same manner as any four successive conductors on the scale member are connected.

It will be noted that, in addition to increasing the desired inductive coupling between the slider and scale members, each grouping of the four coils introduces an undesirable component of inductive coupling. The undesirable inductive coupling component prevents the attainment of a zero net voltage at scale member output terminals 57 and 58 even in the event that each of the four conductors of the slider member is located precisely at the midpoint between the facing conductors of the scale member.

Assume that an alternating potential is applied between the terminals 59 and 60 to cause an instantaneous flow of current in the direction indicated by the arrowheads on the conductors of group 49 for the slider member. In this case, there will be a flow of current through the conductors of group 49 toward the right in the view of FIG. 6. Said direction of current obtains within conductors 70 which interconnect the individual vertically arranged conductors comprising group 49. The magnetic fields produced by the flow of current in connecting conductors 70 induces in the scale conductor connecting members 77 a relatively constant and undesired potential which is independent of the relative position between the slider and scale members. The continued presence of the undesired potential would preclude a zero amplitude signal at scale member output terminals 57 and 58 irrespective of the position of the slider.

To eliminate the undesirable inductive coupling arising from the use of grouped slider members 49, two groups 49 and 71 of slider members are arranged as shown in FIG. 6 to form one complete slider coil 51 having terminals 59 and 60. As will be seen more fully later, the arrangement of groups 49 and 71 not only eliminates the undesirable inductive coupling but also cancels objectionable capacitive coupling acting between the slider and scale members and further increases the desirable inductive coupling between the two.

The two groups 49 and 71 are interconnected by conductor 72 so that the same series current instantaneously flows from left to right in group 49 and from right to left in group 71 or vice versa. That is, the left-right direction of current flow in group 49 is always opposite to that in group 71 indepedent of the phase or polarity of the potential applied to input terminals 59 and 60. As a result of this arrangement, potentials of opposite sense are induced in conductors 48 of the scale member due to the left-right flow of current in groups 49 and 71. The amplitudes of the two opposed induced voltages are substantially equal independent of the displacement between groups 49 and 71. However, groups 49 and 71 must be displaced relative to each other in a particular way in order that the desired potentials induced by the vertically arranged conductors of groups 49 and 71 are additive in scale member conductors 48. In the case of FIG. 6, this displacement is equal to twice the spacing between adjacent scale conductors. Any other even multiple of said spacing may be employed.

It will be seen that for a given polarity of input potential applied between terminals 59 and 60, current will be induced in scale conductors 48 flowing in the direction indicated by the arrowheads. That is, the inductive coupling between conductors 48 and grouped conductors 49 and 71 will be additive in the scale member. The net inductive effect is equivalent to that of a single slider conductor located at the central axis 61 of the slider coil 51 (comprising grouped conductors 49 and 71), which is more closely coupled to the scale member than is actually feasible with a single conductor. It will be observed that the slider coil 51 is shown in FIG. 6 at a position of maximum inductive coupling to the scale member. A minimum or null coupling occurs when the axis 61 is midway between any two scale conductors 48.

As previously mentioned, the present invention also takes into account and cancels undesirable capactive coupling between the slider and scale members. For the purpose of exposition, the distributed capacitive coupling between said members is represented by capacitors 73 shown connected between the respective conductors by the dotted lines. It is to be understood that the capacitive coupling is distributed and so a very large number of capacitors could be shown between the sliders and scale members. In view of the symmetry depicted in FIG. 6, however, the cancellation of the undesirable capactive coupling represented by the capacitors can be explained with the aid of the eight capacitors shown. This is especially true because the amount of capacitive coupling between the energized slider coil 51 and the scale conductors 48 rapidly diminishes at points to the left and to the right of the position of slider coil 51 along the scale member.

Assuming the direction of current flow indicated by the arrowheads on the conductors of coil 51, currents would flow as indicated through the capacitors 73. By inspection, it can be seen that the direction of the capacitive current flowing between group 49 and the scale member is opposite to that flowing between group 71 and the scale member. Moreover, in the null position between the slider and scale members, the oppositely flowing capacitive currents will be equal so as to produce complete cancellation with respect to output terminals 57 and 58 of the scale member. In this way the indicated spatial displacement between grouped conductors 49 and 71 simultaneously accomplishes the following three purposes requisite to precise operation of the inductive pick-off of FIG. 6: (1) desirable inductive coupling between slider 51 and scale conductors 48 is increased eight-fold over that achievable through the use of a single slider conductor; (2) the effect of undesirable capacitive coupling between the slider and scale members is avoided; (3) undesirable inductive coupling precluding the attainment of a zero potential at output terminals 57 and 58 of the scale member is eliminated.

The separation between adjacent slider coils 51, 74 and 75 is determined in accordance with the desired vernier ratio. In the case of FIG. 6, an illustrative vernier ratio of 5:1 is depicted although only three of the required five coils are shown for the sake of simplicity and clarity. Accordingly, the displacement between adjacent slider coils 51, 74 and 75 is not an even multiple of the spacing between adjacent scale conductor 48 but is instead, an even multiple less the vernier ratio fraction of the separation between adjacent scale conductors 48. When the vernier ratio is 5:1 as in the illustrative case of FIG. 6, the displacement 76 between a representative adjacent pair of slider coils 51 and 74 is twice the separation between scale conductors 48 less one-fifth said separation.

Each of the input terminal pairs of slider coils 51, 74 and 75 (such as terminal pair 59 and 60 of slider coil 51) is connected by respective energizing leads 78 to slider selector switch 79 of FIG. 1. In accordance with the fine data control signal output of tape reader 21, one of said input terminal pairs is energized to the exclusion of the others. Thus, slider selector switch 79 performs the function of a digital to analog converter which converts the fine digital positional information of the tape into an energized analog one of the slider coils. The signal for energizing the slider coils is derived from oscillator 15.

It will be seen that a succession of voltage nulls will appear at output terminals 57 and 58 each time that the selectively energized coil of the slider member is moved relative to the scale member through a distance equaling the separation between the adjacent scale member conductors 48. As is well understood in the art, one of the nulls gives rise to a stable null-seeking servo characteristic. That is, the servo which positions the slider member relative to the scale member will drive the slider member only toward the stable null condition. In a representative case wherein the scale conductors 48 are separated from each other by .025 inch, the stable nulls occur at intervals of .050 inch.

With the 5:1 vernier arrangement of FIG. 6, where the separation 76 between slider coils 51 and 74 is equal to twice the distance between scale conductors 48 less one-fifth said distance, the slider member can be conventionally driven by the fine positioning servo to any given one of five intermediate vernier positions within a selected position total slider displacement range of 0.050 inch. This would produce vernier positioning interval of 0.010 inch.

It is desirable, however, that the fine position and interval be reduced to a lesser magnitude. By means of the relatively simple expedients to be described, the structure of FIG. 6 can be utilized to achieve such a result. Coarse positioning pick-off 7 is designed to produce a discrete output signal for every .025 inch displacement of the slider member relative to the scale member. For every discrete output signal from coarse position pick-off 7, there is a corresponding discrete signal output available in the taped coarse positional data sensed by reader 21. This, in turn, makes possible the production of a null output from comparator 11 at a coarse null preselected by the coarse signal output 23 of tape reader 21.

Neglecting for the moment the effect of the vernier arrangement of the side coils, two fine position nulls (of which only one is stable) is available in the arrangement of FIG. 6 for every .050 inch displacement of the slider member relative to the scale member. According to the present invention, the coarse null separation of .025 inch can be exploited by modifying the fine positional control means so that either one of the fine position nulls may be selectively made into a stable null to correspond to the selected coarse null. In terms of the apparatus of FIG. 1, this is accomplished through the provision of phase selector switch 80 which intercouples amplifier 81 and fine-coarse switch 17. Amplifier 81 amplifies the fine positional signal as sensed by the scale member 45.

Phase selector switch 80 includes a paraphase amplifier and a selector switch which selectively couples to switch 17 a predetermined one of the two oppositely phased output signals of the paraphase amplifier. One of said output signals will be in phase with the 10,000 cycle fine error signal; the other output will be in phase opposition thereto. When the selector switch 80 couples the in-phase signal to switch 17, the alternate stable ones of the fine position nulls will determine the ultimate position of the fine positioning servo mechanism. Conversely, when the phase inverted output is selected by switch 80 for application to switch 17, the intervening alternate ones of the fine positioning nulls will control the fine positioning servo mechanism. In essence, selector switch 80 determines which of the fine positional nulls is to be the stable null.

In operation, tape reader 21 simultaneously reads out coarse and fine positional data for determining to a high degree of precision the position of slider member 46 with respect to scale member 45. The coarse positional data is applied via line 23 to converter 29 which converts the coarse digital data into an analog electrical signal for application to comparator 11. Coarse positional pick-off 7 produces a corresponding analog electrical signal having an amplitude determined by the position of slider member 46. Concurrently therewith, fine digital data signals are applied via line 25 to slider selector switch 79. Switch 79, in response to the fine digital data signal, selectively energizes an analog one of the slider coils such as coils 51, 74 and 75 of FIG. 6. In addition, a separate binary signal is applied via line 25 to switch 79 for determining which of the fine positional nulls is to be the stable null. Switch 79, in response to said binary signal, selectively energizes switch 80 so that a corresponding one of the in-phase and out-of-phase output signals is applied to switch 17.

When slider 46 is positioned with respect to scale member 45 by motor 1, the amplitude of the coarse error signal being coupled by fine-coarse switch 17 to rectifier 19 reduces toward zero. Fine-coarse switch 17 is actuated to couple the fine error signal output of switch 80 in lieu of the coarse error signal output of modulator 13 to rectifier 19 when the coarse error signal amplitude falls below a predetermined level. The final ultimate positioning of slider member 46 is afforded by the selected fine error signal output of selector switch 80 whereby, in accordance with the illustrative arrangement of FIG. 6, slider 46 is accurately positioned to a predetermined one of the five subdivisions of a predetermined coarse error signal null increment. Inasmuch as the illustrative coarse error signal null increment is .025 inch, the subdivisions are separated from each other by .005 inch. If a twenty-five to one vernier ratio is employed, for example, the final position increment is reduced to .001 inch.

What is claimed is:

1. A positional pickoff device comprising a scale member and a slider member, said scale member including a series of uniformly spaced and parallelly disposed electrical conductors connected in series circuit whereby the same current flows in adjacent ones of said conductors in opposite spacial directions, and said slider member including two identical groups of uniformly spaced and parallelly disposed electrical conductors, the spacing between the conductors of each group being equal to said spacing between said scale member conductors, the first conductors of said groups comprising a first corresponding pair and the last conductors of said groups comprising a second corresponding pair, the conductors of one of said pairs being directly connected together and the conductors of the other of said pairs being connected to respective input terminals, the conductors of both groups being connected to form a series circuit between said input terminals wherein the same current flows in adjacent ones of the conductors in each group in opposite spacial directions and the same current flows in corresponding ones of the conductors of both groups in opposite spacial directions.

2. A positional pickoff device comprising a scale member and a slider member, said scale member including a series of uniformly spaced and parallelly disposed electrical conductors connected in series circuit whereby the same current flows in adjacent ones of said conductors in opposite spacial directions, and said slider member including two identical groups of uniformly spaced and parallelly disposed electrical conductors, the spacing between the conductors of each group being equal to said spacing between said scale member conductors, the spacing between said groups being equal to an even multiple of said spacing between said scale member conductors, the first conductors of said groups comprising a first corresponding pair and the last conductors of said groups comprising a second corresponding pair, the conductors of one of said pairs being directly connected together and the conductors of the other of said pairs being connected to respective input terminals, the conductors of both groups being connected to form a series circuit between said input terminals wherein the same current flows in adjacent ones of the conductors in each group in opposite spacial directions and the same current flows in corresponding ones of the conductors of both groups in opposite spacial directions.

3. A positional pickoff device comprising a scale member and a slider member, said members being mounted for close clearing relative movement, the scale member including a series of uniformly spaced parallelly disposed electrical conductors connected in series circuit whereby the same current flows in adjacent ones of said conductors in opposite spacial directions, and said slider member including a plurality of spaced identical groups of electrical conductors, the spacing between each adjacent pair of said groups on said slider being different from an even multiple of the spacing between said scale member electrical conductors by $1/N$ of the spacing between said scale member conductors wherein $N$ is the number of said groups, each of said groups comprising two identical subgroups of uniformly spaced parallelly disposed electrical conductors, the spacing between the conductors of each subgroup being equal to said spacing between said scale member conductors, the spacing between said subgroups being equal to an even multiple of said spacing between said scale member conductors, the first conductors of said subgroups comprising a first corresponding pair and the last conductors of said subgroups comprising a second corresponding pair, the conductors of one of said pairs being directly connected together and the conductors of the other of said pairs being connected to respective input terminals, the conductors of both subgroups being connected to form a series circuit between said input terminals wherein the same current flows in adjacent ones of the conductors in each subgroup in opposite spacial directions and the same current flows in corresponding ones of the conductors of both subgroups in opposite spacial directions.

4. A positional control system for driving a first element to an ordered precise position with respect to a second element, comprising positional pickoff means including a scale member on one of said elements and a slider member on the other of said elements in cooperative relationship with said scale member, said scale member and said slider member including a series of uniformly spaced energy transfer means, an actuator for moving said first element, coarse means for controlling said actuator to move said first element to a position that approximates the ordered position within a deviation of less than half said spacing between said energy transfer means, control means for energizing said transfer means on said slider member, fine means responsive to the sense and degree of energy transfer between said energized transfer means and said scale member for controlling said actuator to move said first element to a point where said degree of energy transfer reaches a predetermined value, and means coupled to and actuated by said control means for selectively reversing the sense of operation of said fine means.

5. A positional control system for driving a first element to an ordered precise position with respect to a second element, comprising position pickoff means including a scale member on one of said elements and a slider member on the other of said elements in cooperative relationship with said scale member; said scale member including a series of uniformly spaced energy transfer means and said slider member including a plurality of uniformly spaced groups of energy transfer means, the spacing between successive groups on said slider member being different from an integral multiple of the spacing between the individual transfer means on said scale member by $1/N$ of said spacing between said individual transfer means, where N is the number of said groups; a motor connected to move said first element, course means for controlling said motor to move said first element to a position that approximates the ordered position within a deviation of less than half said spacing between said individual transfer means, control means for selectively energizing one of said groups of transfer means on said slider member corresponding to the precise ordered position of said first element, servo means responsive to the sense and degree of energy transfer between said energized group and said scale member to control said motor for moving said first element to a point where said degree of energy transfer reaches a null value, and means coupled to and actuated by said control means for selectively controlling the sense of operation of said servo means.

6. In a null-seeking servo positioning system of the coarse-fine type wherein the coarse error signal and the fine error signal selectively control the operation of said servo system, and the fine error signal may assume successive stable and unstable null values, means actuable with the coarse positioning means for selectively reversing the sense of the fine error signal when a coarse null substantially concurs with an unstable fine null.

7. A positional control system for driving a first machine element to an ordered precise position with respect to a second machine element, comprising position pickoff means including a scale member on one of said elements and a slider member on the other of said elements in cooperative relationship with said scale member, said scale member including a series of uniformly spaced and parallelly disposed electrical conductors connected in series circuit whereby the same current flows in adjacent ones of said conductors in opposite spacial directions; and said slider member including a plurality of spaced identical groups of electrical conductors, the spacing between each adjacent pair of said groups on said slider being different from an even multiple of the spacing between said scale member electrical conductors by $1/N$ of the spacing between said scale member conductors where N is the number of said groups, each of said groups comprising two identical subgroups of uniformly spaced parallelly disposed electrical conductors, the spacing between the conductors of said subgroup being equal to the spacing between said scale member conductors, the first conductors of said subgroups comprising a first corresponding pair and the last conductors of said subgroups comprising a second corresponding pair, the conductors of one of said pairs being directly connected together and the conductors of the other of said pairs being connected to respective input terminals, the conductors of both subgroups being connected to form a series circuit between said input terminals wherein the same current flows in adjacent ones of the conductors in each subgroup in opposite spacial directions and the same current flows in corresponding ones of the conductors of both subgroups in opposite spacial directions; means for energizing selectively one of said groups of electrical conductors on said slider member corresponding to the precise position of said first machine element, and means responsive to the degree of energy transfer between the selectively energized group and said scale member to move said first machine element to a point where said degree of energy transfer reaches a predetermined value.

8. A positional control system for driving a first machine element to an ordered precise position with respect to a second machine element, comprising position pickoff means including a scale member on one of said elements and a slider member on the other of said elements in cooperative relationship with said scale member; said scale member including a series of uniformly spaced parallelly disposed electrical conductors connected in series circuit whereby the same current flows in adjacent ones of said conductors in opposite spacial directions; and said slider member including a plurality of spaced identical groups of electrical conductors, the spacing between each adjacent pair of said groups on said slider being different from an even multiple of the spacing between said scale member electrical conductors by $1/N$ of the spacing between said scale member conductors where N is the number of said groups, each of said groups comprising two identical subgroups of uniformly spaced parallelly disposed electrical conductors, the spacing between the conductors of each subgroup being equal to said spacing between said scale member conductors, the spacing between said subgroups being equal to an even multiple of said spacing between said scale member conductors, the first conductors of said subgroups comprising a first corresponding pair and the last conductors of said subgroups comprising a second corresponding pair, the conductors of one of said pairs being directly connected together and the conductors of the other of said pairs being connected to respective input terminals, the conductors of both subgroups being connected to form a series circuit between said input terminals wherein the same current flows in adjacent ones of the conductors in each subgroup in opposite spacial directions and the same current flows in corresponding ones of the conductors of both subgroups in opposite spacial directions; a motor connected to move said first machine element, coarse means for controlling said motor to move said first machine element to a position that approximates the ordered position within a deviation of less than said spacing between adjacent electrical conductors on said scale member, means for energizing selectively one of said groups of electrical conductors on said slider member corresponding to the precise ordered position of said first machine element, and means responsive to the degree of energy transfer between the selectively energized group and said scale member to control said motor for moving said first machine element to a point where said degree of energy transfer reaches a predetermined value.

9. A pickoff device comprising a scale member and a slider member in inductive relationship with said scale member, said scale member including a series of uniformly spaced and parallelly disposed electrical conductors connected in series circuit whereby the same current flows in adjacent ones of said conductors in opposite spacial directions; and said slider member including a plurality of spaced identical groups of electrical conductors, the spacing between each adjacent pair of said groups on said slider being different from an even multiple of the spacing between said scale member electrical conductors by $1/N$ of the spacing between said scale member conductors where N is the number of said groups, each of said groups comprising two identical subgroups of uniformly spaced parallelly disposed electrical conductors, the spacing between the conductors of each said subgroup being equal to the spacing between said scale member conductors, the first conductors of said subgroups comprising a first corresponding pair and the last conductors of said subgroups comprising a second corresponding pair, the conductors of one of said pairs being directly connected together and the conductors of the other of said pairs being connected to respective input terminals, the conductors of both subgroups being connected to form a series circuit between said input terminals wherein the same current flows from adjacent ones of the conductors in each subgroup in opposite spacial directions and the same current flows in corresponding ones of the conductors of both subgroups in opposite spacial directions; and means for mounting said scale and slider members for close clearing relative movement in a direction transverse to the direction of said parallelly disposed electrical conductors of said scale and slider members.

10. A pickoff device comprising a scale member and a slider member in inductive relationship with said scale member, said scale member including a series of uniformly spaced parallelly disposed electrical conductors connected in series circuit whereby the same current flows in adjacent ones of said conductors in opposite spacial directions; and said slider member including a plurality of spaced identical groups of electrical conductors, the spacing between each adjacent pair of said groups on said slider member being different from an even multiple of the spacing between said scale member electrical conductors by $1/N$ of the spacing between said scale member conductors where N is the number of said groups, each of said groups comprising two identical subgroups of uniformly spaced parallelly disposed electrical conductors, the direction of said conductors of said slider member being parallel to the direction of said conductors of said scale member, the spacing between the conductors of each said subgroup being equal to said spacing between said scale member conductors, the spacing between said subgroups being equal to an even multiple of said spacing between said scale member conductors, the first conductors of said subgroups comprising a first corresponding pair and the last conductors of said subgroups comprising a second corresponding pair, the conductors of one of said pairs being directly connected together and the conductors of the other of said pairs being connected to respective input terminals, the conductors of both subgroups being connected to form a series circuit between said input terminals wherein the same current flows in adjacent ones of conductors in each subgroup in opposite spacial direction and the same current flows in corresponding ones of the conductors of both subgroups in opposite spacial directions, and means for mounting said scale and slider members for close clearing relative movement in a direction perpendicular to the direction of said parallelly disposed electrical conductors of said scale and slider members.

11. A positionable control system for driving a first machine element to an ordered precise position with respect to a second machine element, comprising position pickoff means including a scale member on one of said elements and a slider member on the other of said elements in cooperative relationship with said scale member; said scale member including a series of uniformly spaced parallelly disposed electrical conductors connected in series circuit whereby the same current flows in adjacent ones of said conductors in opposite spacial directions; and said slider member including a plurality of spaced identical groups of electrical conductors, the spacing between each adjacent pair of said groups on said slider being different from an even multiple of the spacing between said scale member electrical conductors by $1/N$ of the spacing between said scale member conductors where N is the number of said groups, each of said groups comprising two identical subgroups of uniformly spaced parallelly disposed electrical conductors, the spacing between the conductors of each said group being equal to said spacing between said scale member conductors, the spacing between said subgroups being equal to an even multiple of said spacing between said scale member conductors, the first conductors of said subgroups comprising a first corresponding pair and the last conductors of said subgroups comprising a second corresponding pair, the conductors of one of said pairs being directly connected together and the conductors of the other of said pairs being connected to respective input terminals, the conductors of both subgroups being connected to form a series circuit between said input terminals wherein the same current flows in adajcent ones of the conductors in each subgroup in opposite spacial directions and the same current flows in corresponding ones of conductors of both subgroups in opposite spacial directions; a motor connected to move said first machine element, coarse means for controlling said motor to move said first machine element to a position that approximates the ordered position within a deviation of less than said spacing between adjacent electrical conductors on said scale member, control means for energizing selectively one of said groups of electrical conductors on said slider member corresponding to the precise ordered position of said first machine element, servo means responsive to the degree of energy transfer between the selectively energized group and said scale member to control said motor for moving said first machine element to a point where said degree of energy transfer reaches a predetermined value, and means coupled to and actuated by said control means for selectively controlling the sense of operation of said servo means.

References Cited in the file of this patent

UNITED STATES PATENTS

| | | |
|---|---|---|
| 2,799,835 | Tripp et al. | July 16, 1957 |
| 2,849,668 | Tripp | Aug. 26, 1958 |
| 2,867,783 | Childs | Jan. 6, 1959 |
| 2,950,427 | Tripp | Aug. 23, 1960 |